April 30, 1935.  C. H. DAVIS, JR  1,999,285
CONNECTION BETWEEN A ROD AND A DIAPHRAGM
Filed April 21, 1932

Inventor
Charles H. Davis, Jr., dec'd
by John T. Fitzsimmons, Administrator

By Spencer Hardman & Fehr
Attorneys

Patented Apr. 30, 1935

1,999,285

UNITED STATES PATENT OFFICE 1,999,285

CONNECTION BETWEEN A ROD AND A DIAPHRAGM

Charles H. Davis, Jr., deceased, late of Anderson, Ind., by John T. Fitzsimmons, administrator, Anderson, Ind., assignor, by mesne assignments, to General Motors Corporation, Detroit, Mich., a corporation of Delaware Application April 21, 1932, Serial No. 606,661

1 Claim. (Cl. 137—157)

This invention relates to devices controlled by fluid pressure and more particularly to devices employing a flexible diaphragm.

It is one of the objects of the present invention to provide a simple means for attaching to the diaphragm a wire or rod which transmits motion from the diaphragm to the part to be controlled.

Further objects and advantages of the present invention will be apparent from the following description, reference being had to the accompanying drawing, wherein a preferred embodiment of one form of the present invention is clearly shown.

Figure 1:
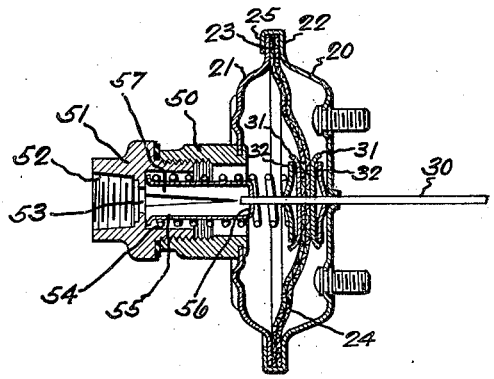
Fig. 1 is a sectional view of a fluid pressure controlled device embodying the present invention.
Figure 4:
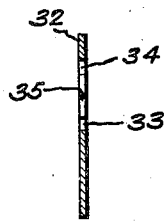
Fig. 4 is a sectional view taken on the line 4—4 of Fig 3.
Figure 3:
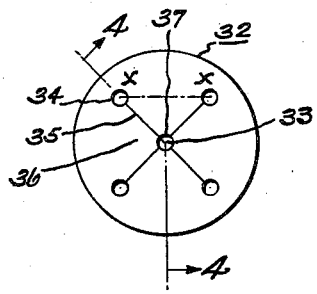
Fig. 3 is a plan view of a washer included in this structure.
Figure 2:
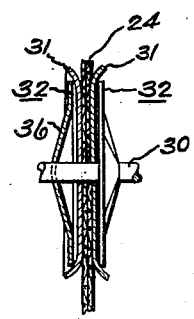
Fig. 2 is a fragmentary sectional view thereof drawn twice the size shown in Fig. 1.
Figure 7:
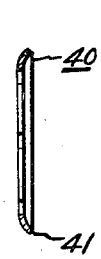
Fig. 7 is a sectional view taken on the line 7—7 of Fig. 6.
Figure 6:
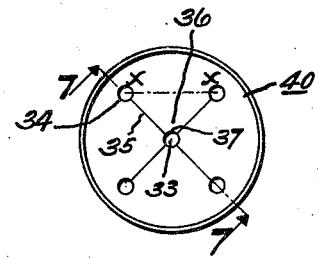
Fig. 6 is a plan view of a washer included in the construction shown in Fig. 5.

Referring to Fig. 1 parts 20 and 21 are pressed metal cup-shaped members between the flanges 22 and 23 of which the edges of a flexible diaphragm 24 are clamped. The flange 22 has a portion 25 bent around the flange 23 to secure the parts permanently in position. The diaphragm 24 is preferably formed by super-posed layers of cloth coated with a substance which makes the cloth substantially air tight. Varnished airplane linen has been found to be satisfactory. The layers of cloth are each provided before assembling with a small hole punched through the center, the hole being smaller than the wire or rod 30 which is to be attached to the diaphragm. Before assembling the diaphragm with the casing members 20 and 21 the diaphragm 24 is assembled together with washers 31 and washers 32 with the rod 30. As shown in Figs. 1 and 2, the washers 31 are cup-shaped, that is provided with flanges which extend away from the diaphragm so that the diaphragm will not be cut by the edges of the washers during the bending of the diaphragm. The washers 31 are clamped against the diaphragm 24 by the washers 32 which are so constructed as to be automatically retained upon the rod 30 in position. Referring to Figs. 3 and 4 each washer 32, formed from sheet spring steel, is provided originally with a central hole 33 slightly smaller in diameter than the diameter of the rod 30. The washer 32 is provided with a circular row of equi-distant holes 34 and with slits 35 each extending from a hole 34 to a center hole 33 thereby providing the washer with a plurality of fingers 36 each bendable about a line joining two of the holes 34 such as the lines $x$—$x$ shown in Fig. 3 and each having an arcuate inner end 37 adapted to bite into the surface of the wire or rod 30. When the washers 32 are forced upon the rod 30 the fingers 36 are caused to spread apart as shown in Figs. 1 and 2. The fingers yield to permit sliding the washers along the rod to the diaphragm 24 but these fingers resist movement of the washers 32 away from the diaphragm due to the fact that the fingers 36 bite into the rod 30. Since the cloth 24 is somewhat compressible, it is apparent that the washers 32 can be forced against the washers 31 and the washers 31 against the diaphragm 24 with pressure causing the cloth to be compressed slightly so that the fingers 36 may hold the washers 32 against the washer 31 and the latter against the diaphragm 24 with pressure sufficient to keep the material of the diaphragm 24 to seal the hole through which the wire 30 extends. Although the cloth 24 may theoretically spring back after clamping pressures against the washer 32 are removed from the outside, the spring fingers 36 will bite into the rod 30 before any appreciable spring back of the cloth 24 can take place.

Figure 5:
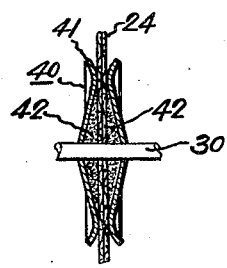
Fig. 5 is a fragmentary sectional view similar to Fig. 2 but showing a modified form of the invention.

In the form shown in Fig. 5, the washers 40 having cup-flanges 41 are provided. Otherwise, the washers 40 are similar to the washers 32. The washers 31 are omitted and the cup flanges 41 bear against the diaphragm cloth 24. Before the washers 40 are placed in position a quantity of sealing compound indicated at 42 is placed on each side of the diaphragm 24. The forcing of the washers 40 against the diaphragm 24 causes this sealing compound to flow in the hole in the diaphragm 24 through which the wire 30 extends, thereby forming a tight joint and sealing the diaphragm.

The sheet of spring steel from which the washers 32 or 40 are stamped is located with respect to the punches and type so that the grain of the steel is parallel to a line $x$—$x$.

Before assembling the housing member 21 with the diaphragm 24, the housing member 21 is provided with an internally threaded bushing 50 and through which the coupling 51 may be screwed the coupling 51 provides a tapped hole 52 attachable to a pipe and a hole 53 communicating with the interior of the bushing and housing member 21. A spring 54 is located between the coupling 51 and a washer 32 and this spring is held in position by a tubular member 55 formed from sheet material and having an apertured wall 56 receiving an end of the rod 30 and with flange 57 against which the left hand end of the spring 54 presses. The sleeve 55 provides means for locking the spring 54 centrally with respect to the bushing 50 and its right hand end wall 56 provides a stop engageable with the adjacent washer 32 for the purpose of limiting motion of the diaphragm 24 toward the left as viewed in Fig. 1.

While the form of embodiment of the present invention as herein disclosed constitutes a preferred form, it is to be understood that other forms might be adopted, all coming within the scope of the claim which follows.

What is claimed is as follows:

In a device of the character described, a diaphragm, a rod for actuating the diaphragm passing through the diaphragm, and means for securing the rod to the diaphragm and including a pair of normally plane clamping discs through which the rod passes and between which the diaphragm is located, each of said discs having a plurality of resilient fingers, each finger extending from a region near the periphery of the disc toward the center and each finger being of such length that the passing of the rod through a disc causes its fingers to be bent away from the normal plane of the disc, each finger terminating in a portion adapted to bite into the rod, and quantities of plastic sealing material located between the discs and the diaphragm and surrounding the rod.

JOHN T. FITZSIMMONS,
*Administrator of the Estate of Charles H. Davis, Jr., Deceased.*